United States Patent [19]
Dainelli

[11] Patent Number: 6,081,939
[45] Date of Patent: Jul. 4, 2000

[54] PORTABLE TOILET

[75] Inventor: Alberto Dainelli, Florence, Italy

[73] Assignee: Findeco S.r.l., Certaldo, Italy

[21] Appl. No.: 09/186,377

[22] Filed: Nov. 5, 1998

[30] Foreign Application Priority Data

Nov. 21, 1997 [IT] Italy .................................. FI97A0257

[51] Int. Cl.[7] ........................... A47K 11/02; A47K 11/03
[52] U.S. Cl. ........................... 4/449; 4/453; 4/459; 4/475
[58] Field of Search ............................. 4/449, 453, 455, 4/459, 474, 475, 661, 464, 321, DIG. 12

[56] References Cited

U.S. PATENT DOCUMENTS

| | | | |
|---|---|---|---|
| 1,419,587 | 6/1922 | Russell et al. | 4/459 |
| 1,509,891 | 9/1924 | Wildman | 4/459 |
| 3,882,552 | 5/1975 | Turner | 4/318 |
| 4,254,515 | 3/1981 | Kiyama et al. | 4/449 |

FOREIGN PATENT DOCUMENTS

1 323 648  7/1963  France .

*Primary Examiner*—David J. Walczak
*Assistant Examiner*—Tuan Nguyen
*Attorney, Agent, or Firm*—Browdy and Neimark

[57] ABSTRACT

A portable toilet comprising a cabana in which a tank is installed to contain liquid and solid waste and a conditioning liquid for said waste, said tank having, in a substantially central position, a port around which an annular seat is provided. Inside the waste-collecting tank, in correspondence to its port, temporary collection apparatus for the waste are provided, being wide enough to substantially cover the whole extension of port. An operating lever for collection apparatus is provided to drive a displacement which causes the unloading of the waste collected thereon after each use, and the subsequent return in a collecting position for a further use. The collection apparatus is removably connected to tank, to clear port when the emptying and cleaning of said tank have to be carried out.

19 Claims, 6 Drawing Sheets

PORTABLE TOILET

FIELD OF THE INVENTION

The present invention concerns the field of the chemical toilets for temporary installations, as in building or industrial yards or on the occasion of outdoor events of various kind (e.g. a sports, folklore or political happening), and namely it relates to an improved portable toilet.

DESCRIPTION OF THE PRIOR ART

A conventional portable toilet comprises, as it is known, by a plastic or aluminium made cabana in which a waste-collecting tank is placed, the tank having a port provided with an annular seat for the user. Generally the tank also contains a waste-conditioning liquid, in particular with an anti-fermentation function, to reduce the generation of bad smells. Known portable toilets, considering the fact that their installation has to be temporary and that they are designed to work where connections with water and/or electric utilities are not available, have very simplified structures. Besides, for the fact that these structures have to be transported from one installation place to another, they have necessarily to be as light as possible. Finally, they have to be simple, so as not to complicate the cleaning operations and to minimise the maintenance ones.

Known portable toilets, even though they comply more or less satisfactorily with these requirements, have the major drawback that the port with annular seat opens a direct communication between the inside and the outside of the tank. This configuration turns out to be disagreeable for the fact that the content of the tank is in sight through the port and above all it is absolutely inadequate for what concerns the hygiene aspect, for the risk of squirts which, in use, may soil or even infect the user.

To remedy this drawback, it has been proposed to close the tank port with a shaped collecting plane, inclined towards a side hole in communication with the inside of the tank. However, this solution leads to other and even more serious problems. A first problem concerns the fact that, water or a flushing device not being available for cleaning, however smooth the surface of the shaped plane can be, it quickly soils in a way that is unacceptable for the user's hygiene. A second drawback consists in the trouble an operator finds in the periodical maintenance and emptying of the tank. As a matter of fact, even if he somehow succeeds in emptying the tank by fitting the suction pipe in the side hole of the shaped plane, a complete cleaning of the tank through said hole is impossible, whereby, after all, one can't eliminate the bad smells caused by the fermentation of the residues inside the tank which can't be removed.

To keep the shaped plane clean, it has been suggested to recirculate upon it the liquid part of the tank content by way of a pump, which can be manually or pedal operated after each use of the toilet. This solution works only when the conditioning liquid inside the tank is fresh, but it becomes rapidly unacceptable when, with use, the liquid becomes full of organic waste, exhaling, as a consequence of its circulation, intolerable bad smells.

For the cleaning of the shaped collecting plane, it has also been proposed to provide the chemical toilet with a flushing device with an auxiliary tank, containing water or the same conditioning liquid as that of the main tank. In this way a certain part of said liquid can be drained out of the auxiliary tank for the cleaning of the shaped plane after each use of the toilet. This solution has nevertheless the drawback that the wash liquid in the auxiliary tank runs out very early with respect to the normal toilet capacity, i.e. the number of times it can be used. Besides, the washing liquid, collecting in the main tank, reduces the capacity thereof, thus more frequent emptying operations being required. Finally, the presence of the auxiliary tank makes the toilet structure heavier, this having a negative effect on transportation operations and costs.

The foregoing clearly shows that the hygiene problem in portable toilets of the above mentioned kind is deeply felt, considering also that the use thereof is restricted by more and more severe regulations on health matters.

SUMMARY OF THE INVENTION

It is therefore the main object of the present invention to provide a portable toilet which, in use, can guarantee greater hygiene conditions than those of conventional portable toilets.

A particular object of the present invention is to provide a portable toilet of the above mentioned kind, wherein the greater hygiene in use is achieved without creating hindrances to the emptying and maintenance operations.

These objects have been achieved with the portable toilet according to the present invention, the main feature of which consists in the fact that inside the waste-collecting tank, in correspondence to its port, temporary collection means for the waste resulting from each use are provided, being wide enough to substantially cover the whole extension of said port, and in the fact that operating means of said collection means are provided to drive a displacement which causes the unloading of the waste collected thereon after each use and the subsequent return in a collecting position for a further use. Namely the collection means are removably connected to the tank, so as to allow an easy access to its inside for the emptying and cleaning operations.

In a preferred embodiment the temporary collection means for the waste comprise a continuous belt wound around two rolls, placed at diametrically opposed sides with respect to said port, one of said rolls being connected to the operating means.

BRIEF DESCRIPTION OF THE DRAWINGS

Other features and advantages of the portable toilet according to the present invention will be apparent from the following description of one of its embodiments, which has to be intended only as an example and not a limitation, with reference to the attached drawings in which.

DESCRIPTION OF THE PREFERRED EMBODIMENT

With reference to the above figures, 1 indicates a tank for a portable toilet, to be installed in a conventional way in a cabana, not shown. The tank is made by compression moulding of a suitable plastic material, and it comprises two parts, an upper part 1a and a lower one 1b (only shown in FIG. 4), sealingly and removably connected to each other in any known way. On the upper part 1a of the tank a hole 2 is sideways formed, a pipe 3 being fitted thereto to convey out of the cabana the vapours and exhalations which generate inside the tank. In a substantially central position on the upper part 1a of tank 1 a port 4 is formed, having a substantially quadrilateral outline, frontally delimited by a round portion 4b from which a frusto-conical wall 4c protrudes into the tank. The edge of port 4 holds a frame 5, which is hinged to one side of the port so that it can be lifted by way of a rotation with respect to said side. Over frame 5 a conventional annular seat 6 is arranged, having a rear extension 6a which is integral to a pin 40, dashed in FIG. 1, pivotally supported by the upper part 1a.

Figure 2:
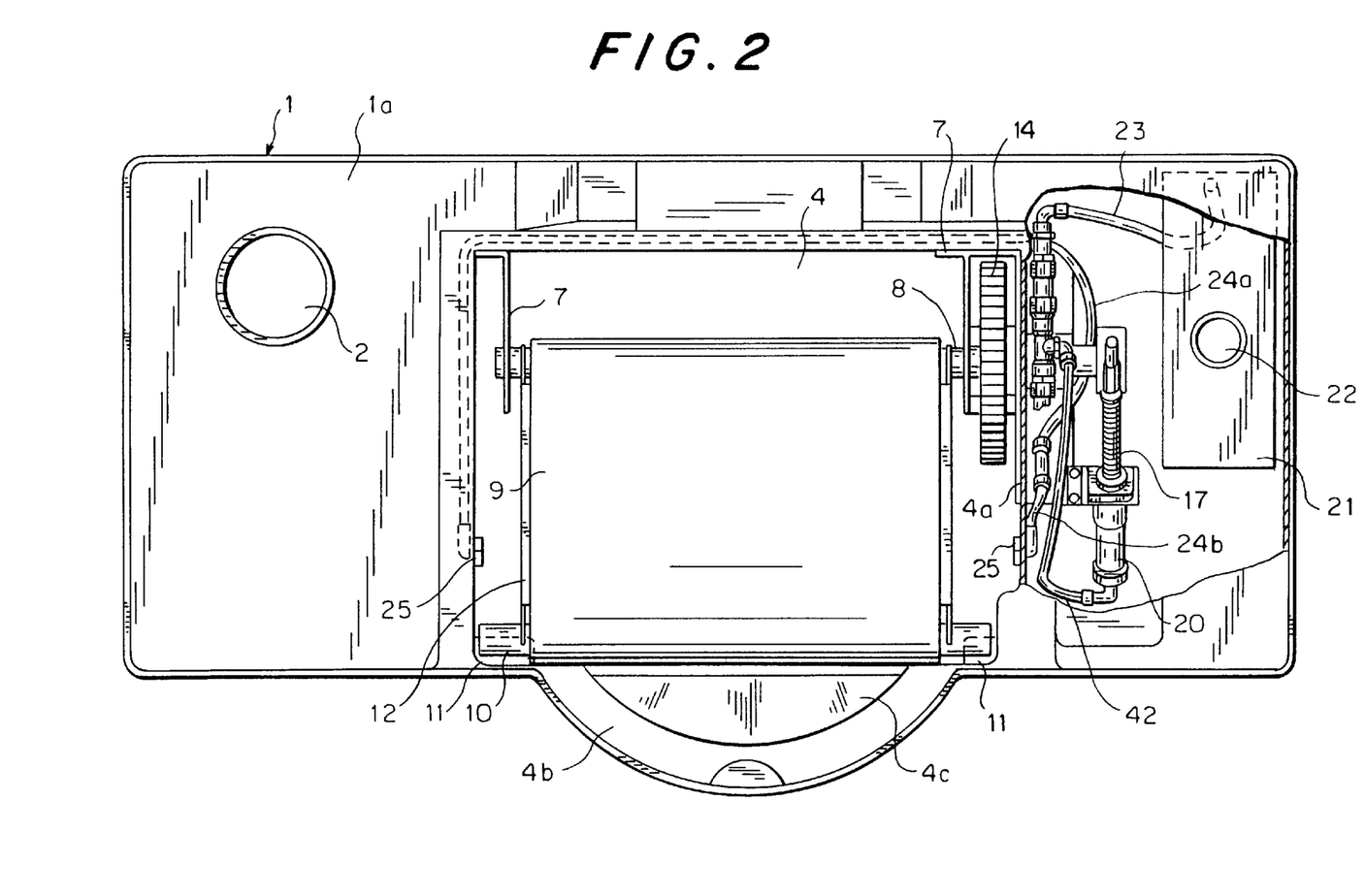
FIG. 2 shows a top plan view of the tank of FIG. 1, with parts in section and parts broken away.

As shown in FIG. 2, two supporting arms 7 for a driving shaft 8 extend from frame 5, in a parallel way with respect to the transversal side thereof and from its side which is opposite to the round edge 4a of port 4, also indicated as rear side. Around driving shaft 8 a continuous belt 9, made with a strong and flexible material, e.g. stainless steel, is wound. Belt 9 extends round an idle shaft 10, parallel to shaft 8 and supported by shoulders 11 which inwardly protrude from the ends of the front round edge of port 4. Shafts 8 and 10 are furthermore supported by a belt frame 12, shown in detail in FIG. 6, which keeps them at a suitable distance. In particular, both shafts 8 and 10 are supported at two different heights with respect to the bottom of the tank, whereby belt 9 is inclined to make the unloading of the waste easier.

Figure 6:
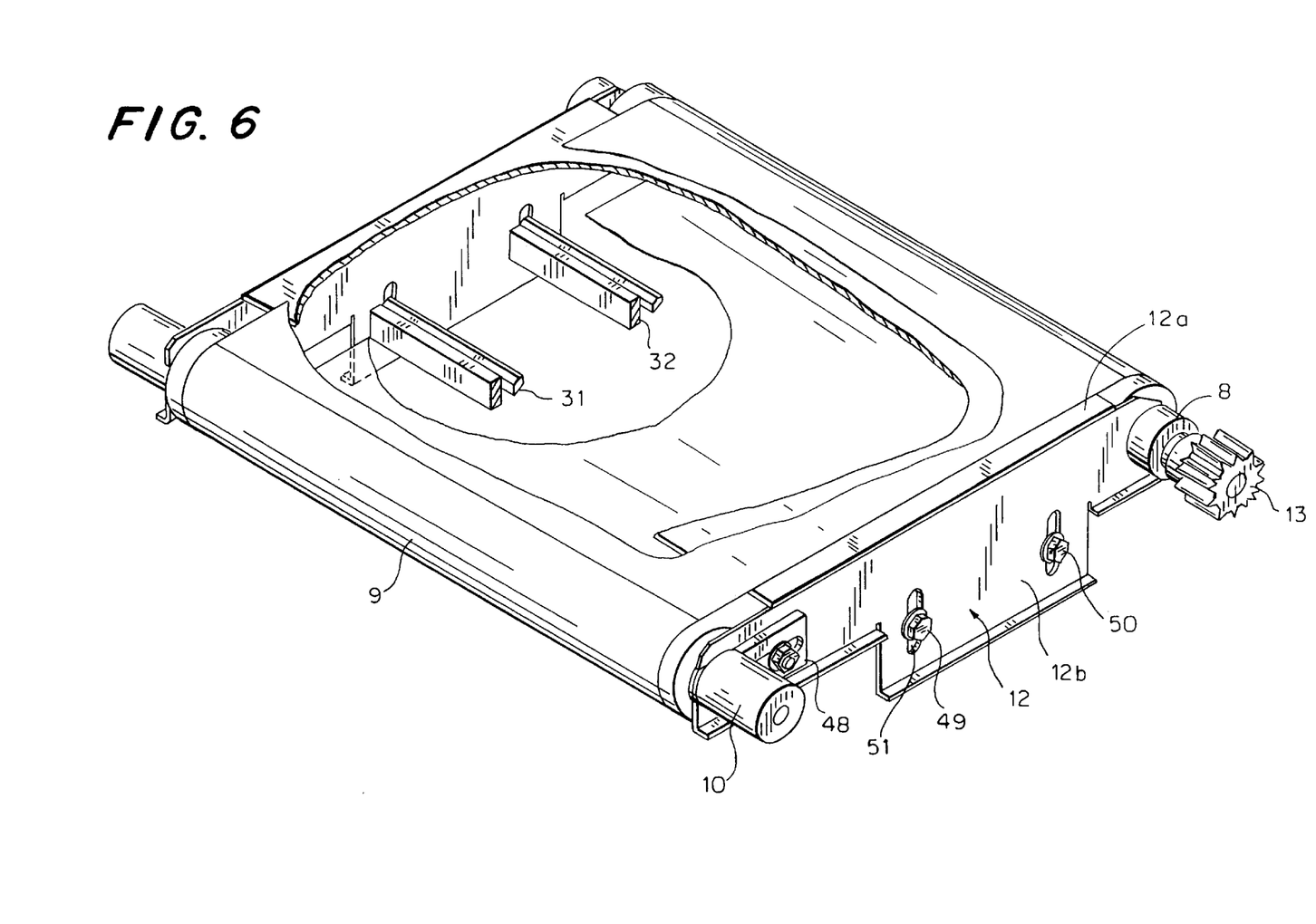
FIG. 6 represents a perspective view of the collection belt and of its support.

As shown in the perspective view of FIG. 6, belt frame 12 is made of a plate 12a, rotatably supporting belt 9, two corresponding fins 12b extending from opposite sides thereof. At the respective ends of fins 12b seats are formed for engagement with driving shaft 8 and idle shaft 10. Two laminar scraping elements 31 and 32 extend between fins 12b in a parallel way with respect to plate 12a, acting upon the surface of the belt which rotatably moves between them and plate 12a. The two scrapers are fixed to fins 12b via nuts 49, 50, screwed on threaded ends of the scrapers protruding from said fins 12b through slots 51, having axis which are orthogonal to plate 12a, so that the position of the scrapers with respect to belt 9 can be regulated to get the right pressure thereon. The tension of belt 9 is regulated instead by displacing a couple of forks 48 (only one of which is shown in FIG. 6) which act on shaft 10 moving it nearer to or farther from shaft 8. The assembly belt 9-belt frame 12 is consequently a whole which can be removed and replaced.

Figure 3:
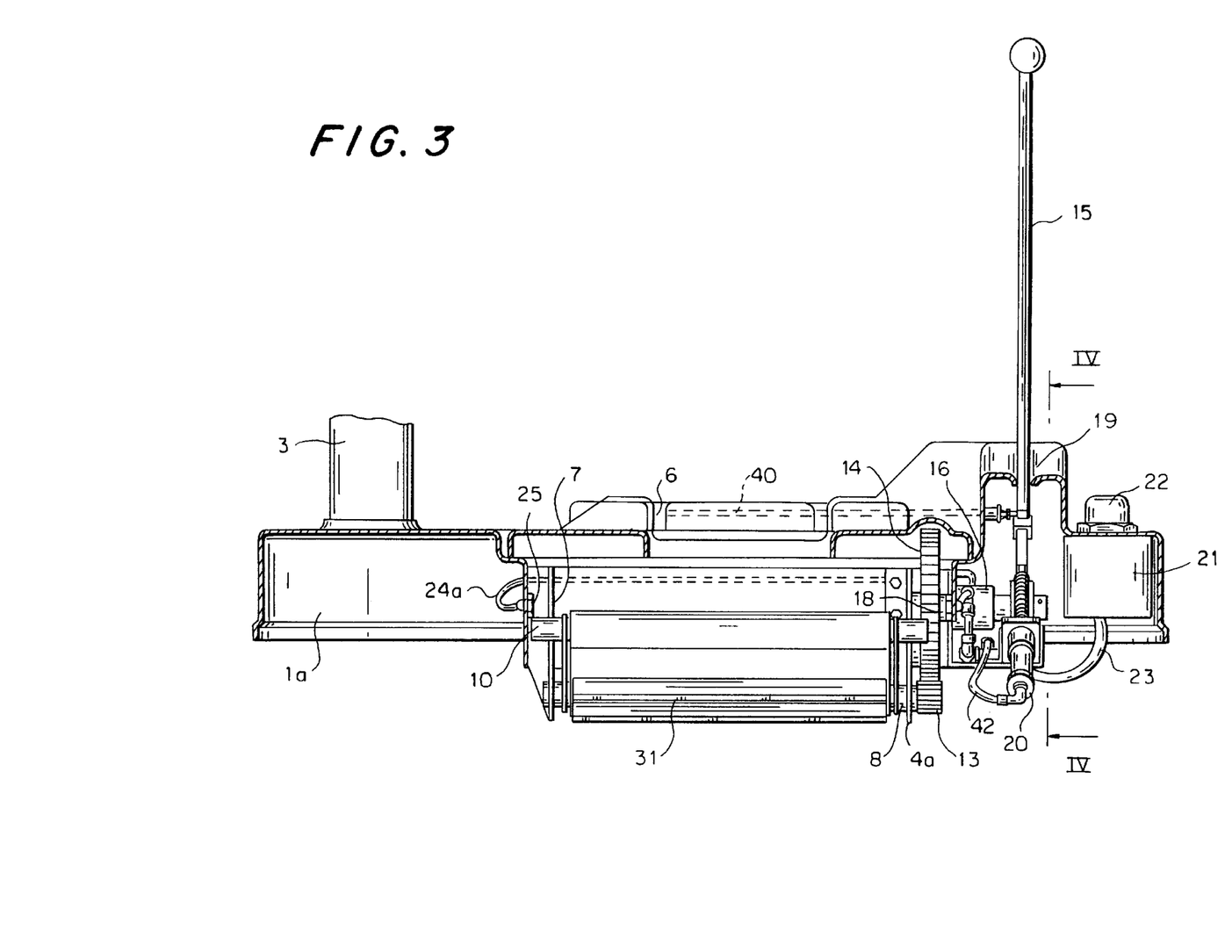
FIG. 3 represents a sectional front view taken along line III—III of FIG. 1.
Figure 4:
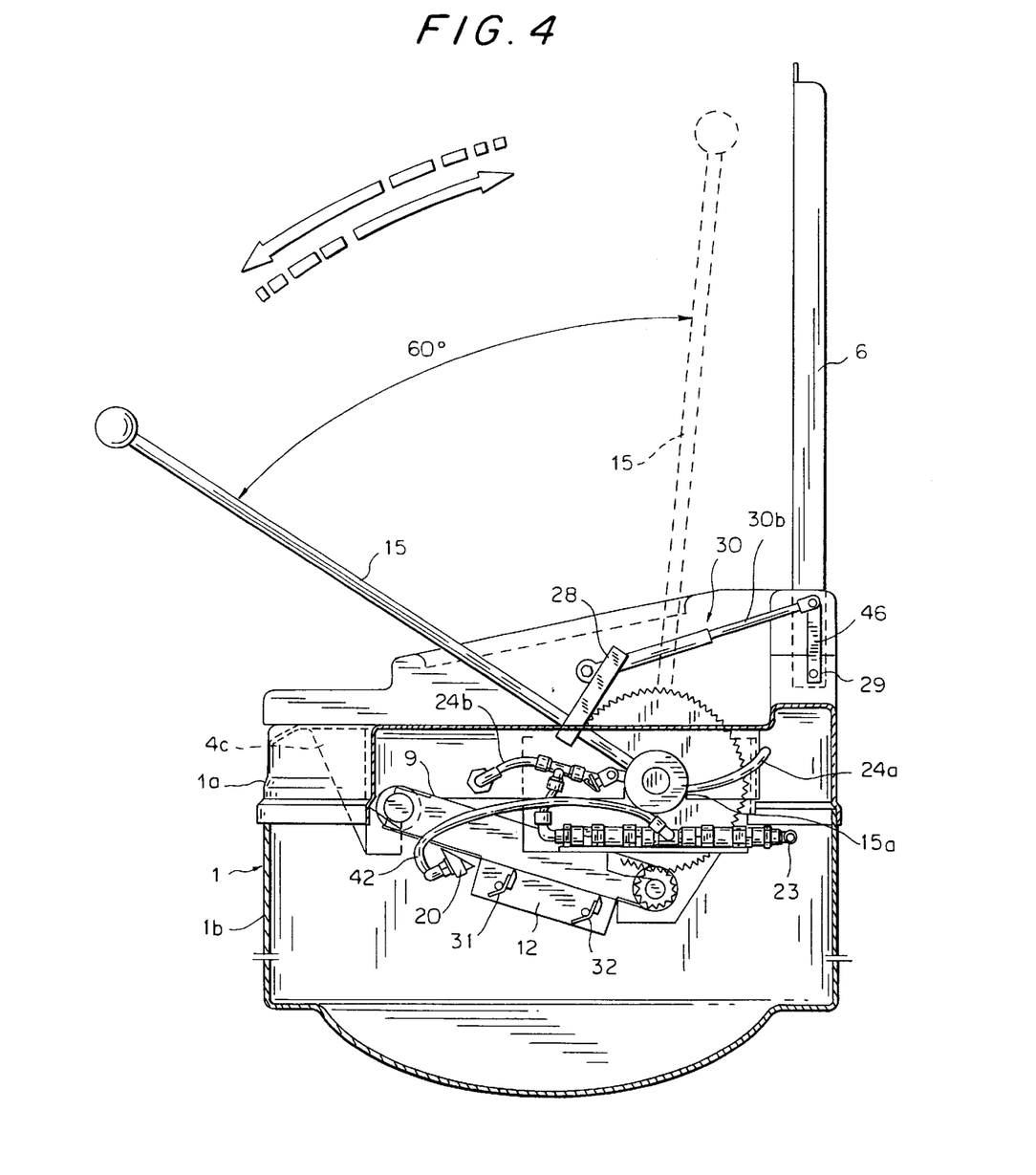
FIG. 4 represents a sectional side view taken along line IV—IV of FIG. 3, with parts broken away for a better understanding, and in which different operating positions are shown.

As shown in particular in FIGS. 3 and 4, a pinion gear 13, keyed on shaft 8, engages with a cogwheel 14 mounted on a shaft 18 protruding from a wall 4a delimiting port 4 inside tank 1. An operating lever 15, extending from the upper part 1a of tank 1 through a slot 19, is connected with shaft 18 by way of a conventional freewheel clutch 16, or equivalent, thereby lever 15 can control the rotation of cogwheel 14 only in one direction, with an elastic return in the opposite one to its start position, as will be described hereinafter.

Under operating lever 15 a dosing piston pump 20 is provided for a sanitising liquid having a deodorising and/or detergent action. The liquid is held in a small tank 21, preferably incorporated in tank 1 and accessible for the supply through a plugged opening 22. Pump 20 is in communication with small tank 21 through a suction duct 23, a non-return valve 41, allowing the flow only towards the pump, and a duct 42, and delivers the liquid through the same duct 42, a second non-return valve 43 to allow only the delivery flow, and a delivery duct 24 which branches into two duct portions 24a and 24b connected to nozzles 25 which face opposite sides of the continuous belt 9 from wall 4a, to spray the liquid on the belt. Non-return valves 41 and 43 are axially aligned to two ends of a T-joint 45, the third end of which engaging with duct 42.

Piston 20a of pump 20, slidingly extending therefrom, is connected at its end to the hub 15a of lever 15 and a helical compression spring 17, coaxial to said piston, is placed between the pump head and an abutment 44 at the end of piston 20a.

Figure 1:
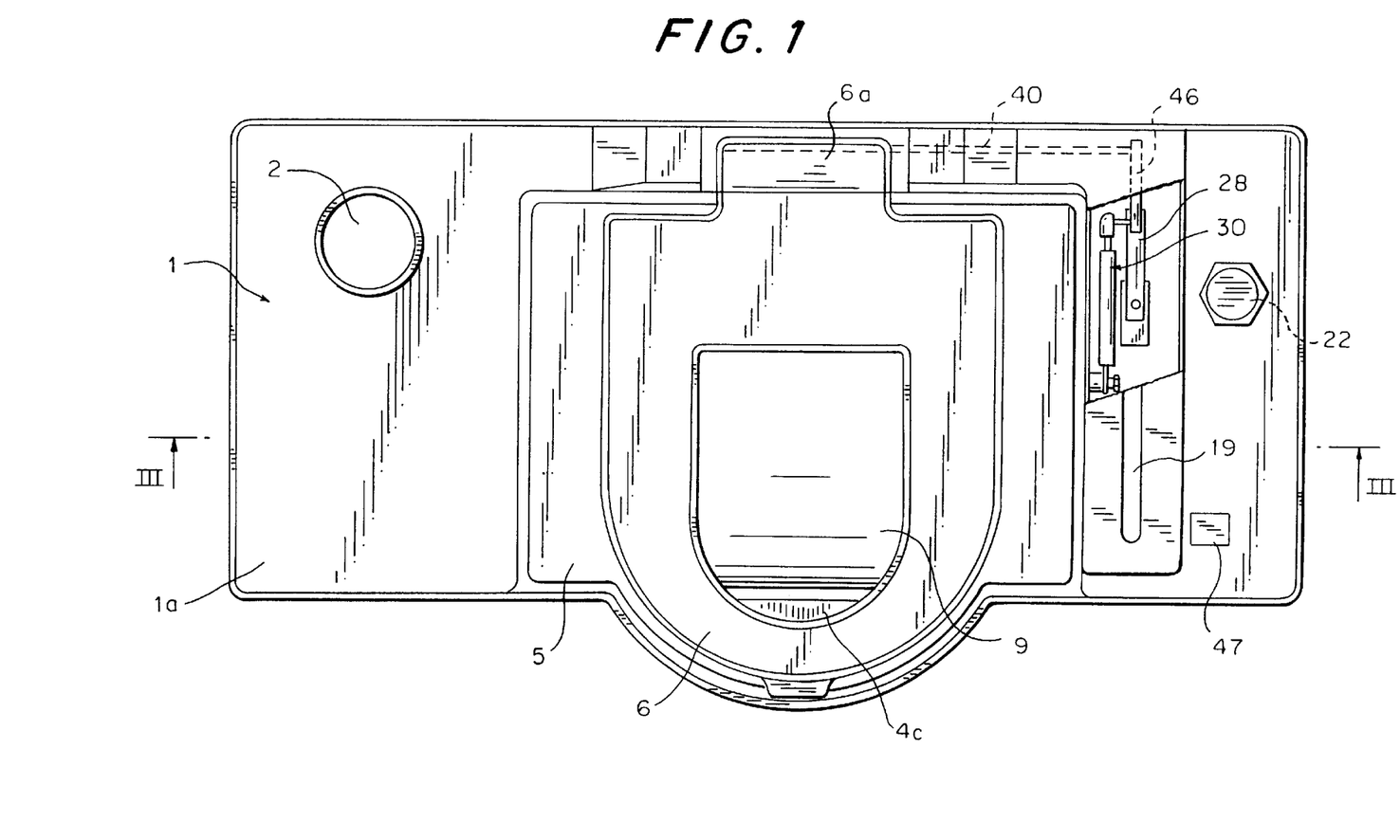
FIG. 1 shows a top plan view of the tank provided in the portable toilet according to the invention.
Figure 5:
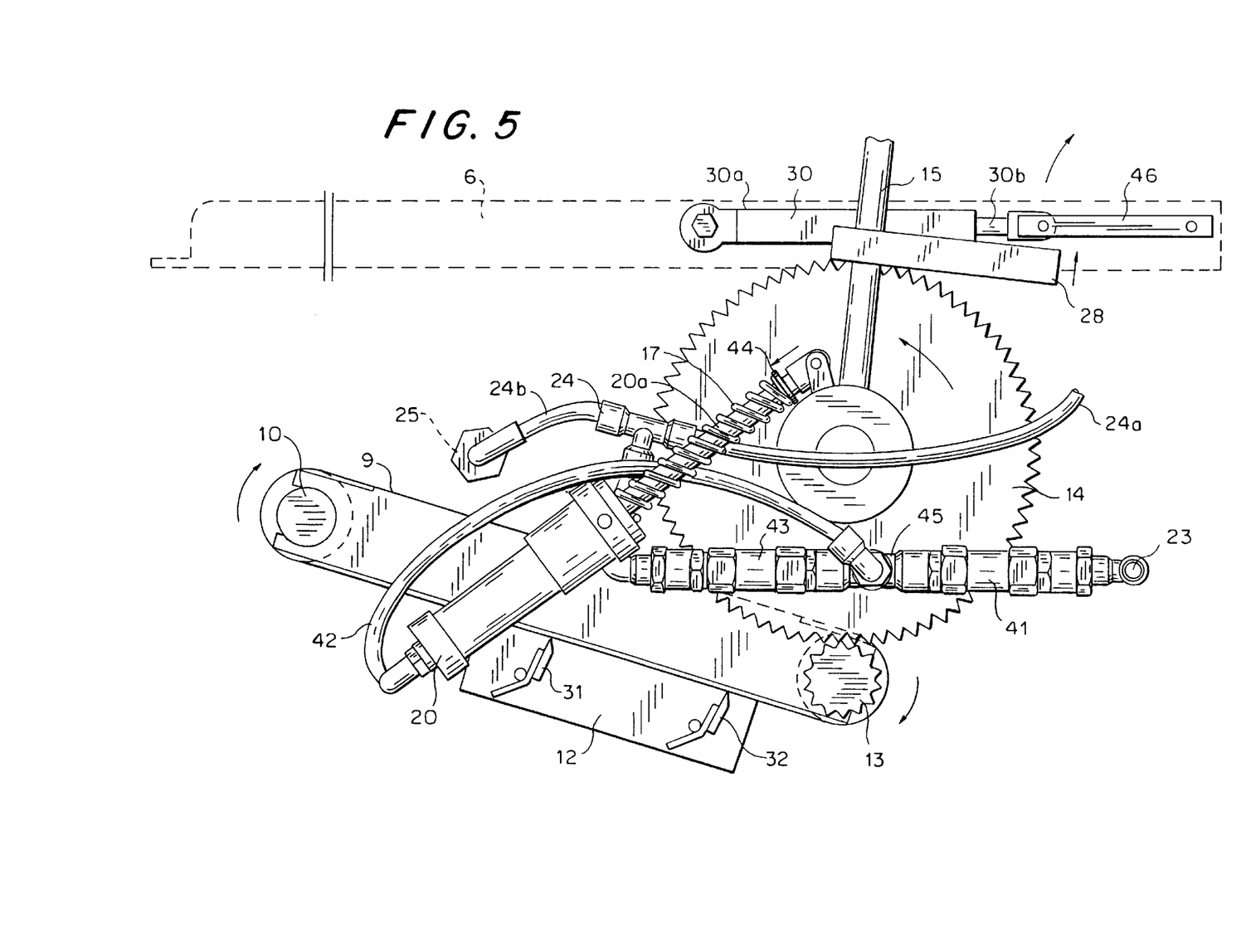
FIG. 5 shows an enlarged partial view of FIG. 4.

As shown in particular in FIGS. 1, 4 and 5, an arm 46 integrally and orthogonally extends from pin 40 of annular seat 6, the free end of said arm being pivoted to the rod 30b of a small piston 30 engaged with a cylinder 30a hinged to the upper part 1a of tank 1. A rod 28 radially and integrally extends from lever 15, arm 46 abuts rod 28 when seat 6 is in its closing position.

Scraping blades 31 and 32, which are located under continuous belt 9 and are in contact with it, are made of rubber or, preferably, one of steel and the other of rubber, for a more efficient scraping of the belt. The moderate pressure exerted by the blades on the belt has the further effect of keeping it in tension.

An indicator 47, e.g. a warning light, is provided on the upper part 1a of tank 1 to signal that the maximum allowed level has been reached in it.

The portable toilet according to the invention works in the following way. After use the user imparts an angular displacement, e.g. as shown in FIG. 5, to lever 15, causing belt 9 to rotate and the waste collected on the belt to be unloaded inside tank 1. During this angular displacement pump 20 feeds the sanitising liquid through duct 42, which in this phase acts as a delivery duct, non-return valve 43 and ducts 24a and 24b, up to nozzles 25, which spray the liquid on belt 9. The angular displacement of lever 15 in the opposite direction, assisted by helical spring 17, does not cause any movements of belt 9 due to the presence of freewheel clutch 16, whereas it causes a return of the sanitising liquid into pump 20, for a further delivery, from tank 21 through suction duct 23, non-return valve 41 and duct 42 which in this phase is a part of the suction circuit.

The provision of the two non-return valves 41 and 43, suitably oriented, permits the correct outflow of the liquid in the suction phase and in the delivery one. The first time in which lever 15 is operated the annular seat is automatically lifted because rod 28 changes its inclination as the lever moves and arm 46 is lifted, thus causing the protrusion of rod 30b and the consequent rotation of seat 6 around its fulcrum 29. In this way arm 46 is lifted and, as seat 6 is now beyond its top dead center with respect to fulcrum 29, during the return rotation of lever 15 it loses contact with rod 28 and so possible, further operations of the lever will not influence the lifted position reached by seat 6. One can operate lever 15 for a number of times, making continuous belt 9 to rotate until it appears sufficiently clean.

Since frame 5 is hinged to tank 1, it can be manually lifted. With this operation belt frame 12, bearing the shafts around which continuous belt 9 is wound can be lifted as well; namely, belt frame 12 rotates around shaft 8 supported by arms 7 and is supported by said frame through shafts 8 and 10. The lifting of belt 9 allows the access to the inside of tank 1 for emptying, cleaning and maintenance operations. Besides driving shaft 8 of belt 9 is removably supported by arms 7 in order to permit the replacement of the whole belt frame 12 with belt 9 and its shafts 8 and 10 in case of need.

The foregoing clearly shows that the portable toilet according to the invention fully achieves the stated objects. First of all the presence of a diaphragm in correspondence to the port of the waste-collecting tank, formed by the movable collecting plane and namely by continuous belt 9, prevents the generation of squirts of liquid sewage and hides to the view the tank content. Besides, the fact that said plane can rotate permits keeping it in the best hygienic and cleaning conditions due to the effect of scraping its surface and spraying with the sanitising, scented and detergent liquid. Finally, the fact that it can be lifted allows to have a large access to the inside of the tank for the normal emptying and cleaning operations.

It is clear that many variations can be brought to the portable toilet according to the present invention. For example, operating lever 15 might be replaced by a pedal, or, in case the portable toilet should be installed where electric energy is available, the manual or by pedal operating might be replaced with a small motor, which could be controlled, for example, via a plunger. In the same way, in the latter case, the pump for the delivery of the sanitising liquid could be electrically operated.

These and other variations and/or modifications can be brought to the portable toilet according to the present invention, without departing from the scope of the invention itself as stated in the appended claims.

What is claimed is:

1. An improved portable toilet comprising a tank for containing liquid and solid waste and a conditioning liquid for said waste, said tank having, in a substantially central position, a port around which an annular seat is provided, wherein inside said tank, corresponding to said port, temporary collection means for the waste resulting from which each use are provided, said collection means having an extension sufficient to substantially cover the whole cross section of said port, and operating means engaged with said collection means for unloading of the waste collected thereon after each use and to subsequently return said collection means to a collecting position for a further use, said collection means being removably connected to said tank to clear said port when emptying and cleaning of said tank is required, wherein said temporary collection means comprise a continuous belt and two rollers, placed at diametrically opposed sides with respect to said port, said continuous belt being wound around and rotatable on said two rollers with one of said two rollers being engaged with said operating means;

wherein said two rollers are rotatably mounted on a first belt frame which is rotatably and separably connected to said tank.

2. The portable toilet according to claim 1, wherein said operating means comprise an actuating element and transmission means for transmitting movement of the actuating element to said collection means.

3. The portable toilet according to claim 2, wherein said actuating element is an angularly displaceable lever and wherein said transmission means is connected to one of said two rollers, whereby rotation is imparted to said belt corresponding to an angular displacement of said lever, said displaceable lever being connected to said transmission means by way of a clutch which can transmit motion only in one direction.

4. The portable toilet according to claim 1, further comprising a second frame on which said annular seat rests, said second frame being rotatably connected to said tank corresponding to said port.

5. The portable toilet according to claim 4, wherein said annular seat is rotatably connected to said tank by way of an actuating device controlled by an angularly displaceable lever; wherein said annular seat is automatically liftable by said actuating device following an angular displacement by said displaceable lever.

6. The portable toilet according to claim 5, wherein a rod integrally extends from said lever for rotating said actuating device with respect to said tank causing said annular seat to lift up to a complete opening position.

7. The portable toilet according to claim 6, wherein said actuating device comprises a cylinder and a spring biased piston stem slidably connected in said cylinder, said cylinder being pivotably connected to the tank and said piston stem being pivotably engaged with the annular seat, the actuating device resting on said rod when said annular seat is resting on said second frame;

wherein an angular displacement of the rod due to rotation of the lever results in rotation of the actuating device and lifting up of the annular seat.

8. The portable toilet according to claim 1, wherein each of said two rollers, are placed at different heights inside said tank.

9. The portable toilet according to claim 1, further comprising means for the delivery of a sanitizing liquid on said collection means, by angular displacement of said operating means.

10. The portable toilet according to claim 1, wherein scraping means for scraping said belt are provided, said scraping means, supported by said first belt frame underneath said belt, transverse to a direction of rotation of said belt.

11. The portable toilet according to claim 1, wherein adjustment means are provided for adjusting a tension of said continuous belt by regulating a position of one roller of said two rollers that is not connected to said operating means with respect to said first belt frame.

12. The portable toilet according to claim 1, wherein said tank is formed by two parts sealingly and removably connected to each other.

13. An improved portable toilet comprising a tank for containing liquid and solid waste and a conditioning liquid for said waste, said tank having, in a substantially central position, a port around which an annular seat is provided, wherein inside said tank, corresponding to said port, temporary collection means for the waste resulting from which each use are provided, said collection means having an extension sufficient to substantially cover the whole cross section of said port, and operating means engaged with said collection means for unloading of the waste collected thereon after each use and to subsequently return said collection means to a collecting position for a further use, said collection means being removably connected to said tank to clear said port when emptying and cleaning of said tank is required;

wherein said temporary collection means comprise a continuous belt and two rollers, placed at diametrically opposed sides with respect to said port, said continuous belt being wound around and rotatable on said two rollers with one of said two rollers being engaged with said operating means;

wherein said two rollers are rotatably mounted on a first belt frame which is rotatably and separably connected to said tank;

wherein said operating means comprise an actuating element and transmission means for transmitting movement of the actuating element to said collection means; and wherein said actuating element is an angularly displaceable lever and said transmission means is connected to one of said two rollers, whereby rotation is imparted to said belt corresponding to an angular displacement of said lever, said displaceable lever being connected to said transmission means by way of a clutch which can transmit motion only in one direction.

14. The portable toilet according to claim 13, further comprising a second frame on which said annular seat rests, said second frame being rotatably connected to said tank corresponding to said port.

15. The portable toilet according to claim 14, wherein said annular seat is rotatably connected to said tank by way of an actuating device controlled by said lever; wherein said annular seat is automatically liftable by said actuating device said angular displacement by said displaceable lever.

16. The portable toilet according to claim 15, wherein a rod integrally extends from said lever for rotating said actuating device with respect to said tank causing said annular seat to lift up to a complete opening position.

17. The portable toilet according to claim 13, wherein each of said two rollers, are placed at different heights inside said tank.

18. The portable toilet according to claim 13, further comprising means for the delivery of a sanitizing liquid on said collection means, by angular displacement of said operating means.

19. The portable toilet according to claim 13, wherein scraping means for scraping said belt are provided, said scraping means, supported by said first belt frame underneath said belt, transverse to a direction of rotation of said belt.

* * * * *